US00RE34980E

United States Patent [19]

Rau et al.

[11] E Patent Number: Re. 34,980

[45] Reissued Date of Patent: Jun. 27, 1995

[54] VACUUM SUCTION MACHINE WITH HIGH EFFICIENCY FILTER AND OPERATING INTERLOCK

[75] Inventors: Jerome E. Rau, Hoffman Estates; Gary E. Palmer, Roselle; Rick McLeod, Lake In The Hills; Margaret Karadimas, Bloomingdale, all of Ill.

[73] Assignee: Minuteman International, Inc., Addison, Ill.

[21] Appl. No.: 148,687

[22] Filed: Nov. 5, 1993

Related U.S. Patent Documents

Reissue of:

[64] Patent No.: 5,102,435
Issued: Apr. 7, 1992
Appl. No.: 667,743
Filed: Mar. 11, 1991

[51] Int. Cl.[6] ..... B01D 46/00

[52] U.S. Cl. ..... 55/467; 55/482; 55/DIG. 34; 15/339

[58] Field of Search ..... 55/274, 467, 470–473, 55/482, 484, 500, 385.1, 385.2, DIG. 3, DIG. 34; 15/339

[56] References Cited

U.S. PATENT DOCUMENTS

| | | | |
|---|---|---|---|
| 4,001,912 | 1/1977 | Eriksson | 15/339 |
| 4,737,173 | 4/1988 | Kudirka et al. | 55/470 |
| 4,786,295 | 11/1988 | Newman et al. | 55/274 |
| 4,894,881 | 1/1990 | Palmer et al. | 55/472 |
| 4,995,891 | 2/1991 | Jaynes | 55/484 |
| 5,015,274 | 5/1991 | Perry | 55/467 |

OTHER PUBLICATIONS

Pullman Holt Asbestos and Hazardous Waste Vacuums, 12 pages (May 1987), Pullman Holt, Tampa Florida 33687.

*Primary Examiner*—Tim R. Miles
*Attorney, Agent, or Firm*—Emrich & Dithmar

[57] ABSTRACT

A vacuum motor and fan are mounted within a housing, the lower end of which receives a high efficiency particle filter. The bottom of the housing includes a series of projections adapted to be received in corresponding apertures on an upper flange of the filter to prevent replacing the filter with an improper one. The projection/apertures also promote proper seating of the seal between the filter canister and the housing. A separate projection on the filter engages and actuates a lock-out switch carried by the housing to permit the machine to operate only when the filter is of proper size and capacity and it is properly seated on the housing.

3 Claims, 3 Drawing Sheets

VACUUM SUCTION MACHINE WITH HIGH EFFICIENCY FILTER AND OPERATING INTERLOCK

Matter enclosed in heavy brackets [ ] appears in the original patent but forms no part of this reissue specification; matter printed in italics indicates the additions made by reissue.

FIELD OF THE INVENTION

The present invention relates to vacuum suction machines having a high efficiency particulate air filter which are designed for the safe removal of hazardous materials, such as those containing asbestos or the like.

BACKGROUND OF THE INVENTION

Vacuum suction machines have come into widespread use for the removal of hazardous materials. Such machines typically employ a number of filter stages. The initial filters are used to remove debris and particles of larger size, and a final stage usually consists of a special filter known in the art as a high efficiency particulate air or HEPA filter. HEPA filters are especially designed to remove particles from air passing through the filter where the particle size extends down to microscopic levels.

HEPA filters, like other filters, become clogged with use and have to be replaced periodically. It is important that a replacement HEPA filter have the same capacity and specifications as the original HEPA filter because when a HEPA filter is replaced, it is enclosed within the machine and cannot ordinarily be seen by the operator. And an operator may not always take the precaution of opening the machine to make sure that the HEPA filter being used is a proper one.

It is also possible that some operators who are particularly careless may remove the HEPA filter and use the vacuum suction machine for other, more conventional uses. When the operator replaces the machine after conventional use, a careless operator may fail to put the HEPA filter back in the machine or to note on the machine that it is not equipped with a HEPA filter. Subsequent operation of such a machine without a HEPA filter for removal of hazardous material would obviously present a hazard to a subsequent operator.

It is also important that HEPA filters be designed for proper sealing with the housing for the vacuum motor because there is a substantial pressure drop across the filter and if there is any leakage of contaminated air around, rather than through the filter, such a condition could also present a hazard to the environment and to operators.

SUMMARY OF THE INVENTION

The present invention overcomes the above problems by providing an actuating member attached to the canister of the HEPA filter which cooperates with and is received in the motor housing. A position switch is mounted to the housing and senses the actuating member on the filter when the filter is properly assembled to the motor housing. The position switch is connected in circuit with the motor and operating switch so that when the HEPA filter is properly in place the motor is enabled to operate, and when the HEPA filter is removed, the motor is disabled.

The canister on the HEPA filter includes an upper mounting flange which is provided with two series or apertures. One set of apertures is used to mount the filter to the motor housing, and the other set of apertures is located to receive a corresponding set of projections integral with the motor housing. Thus, when the filter is assembled to the housing, the filter is properly located so that the mounting flange engages the housing in the proper location and angular disposition. These projections and apertures further prevent replacement of the original HEPA filter with another filter which may not meet the specifications of the machine. If a replacement filter does not have the proper capacity or removal specifications. It may fail to meet government specifications or it may present a hazard during operation.

The projections and apertures also insure proper seating of the filter on the motor housing to effect a seal between the two. A tongue-in-groove seal is formed between the motor housing and the filter canister. The effectiveness of the seal is insured when the filter is properly located and assembled to the filter housing.

Other features and advantages of the present invention will be apparent to persons skilled in the an from the following detailed description of a preferred embodiment accompanied by the attached drawing wherein identical reference numerals will refer to like parts in the various views.

DETAILED DESCRIPTION OF A PREFERRED EMBODIMENT

Figure 1:
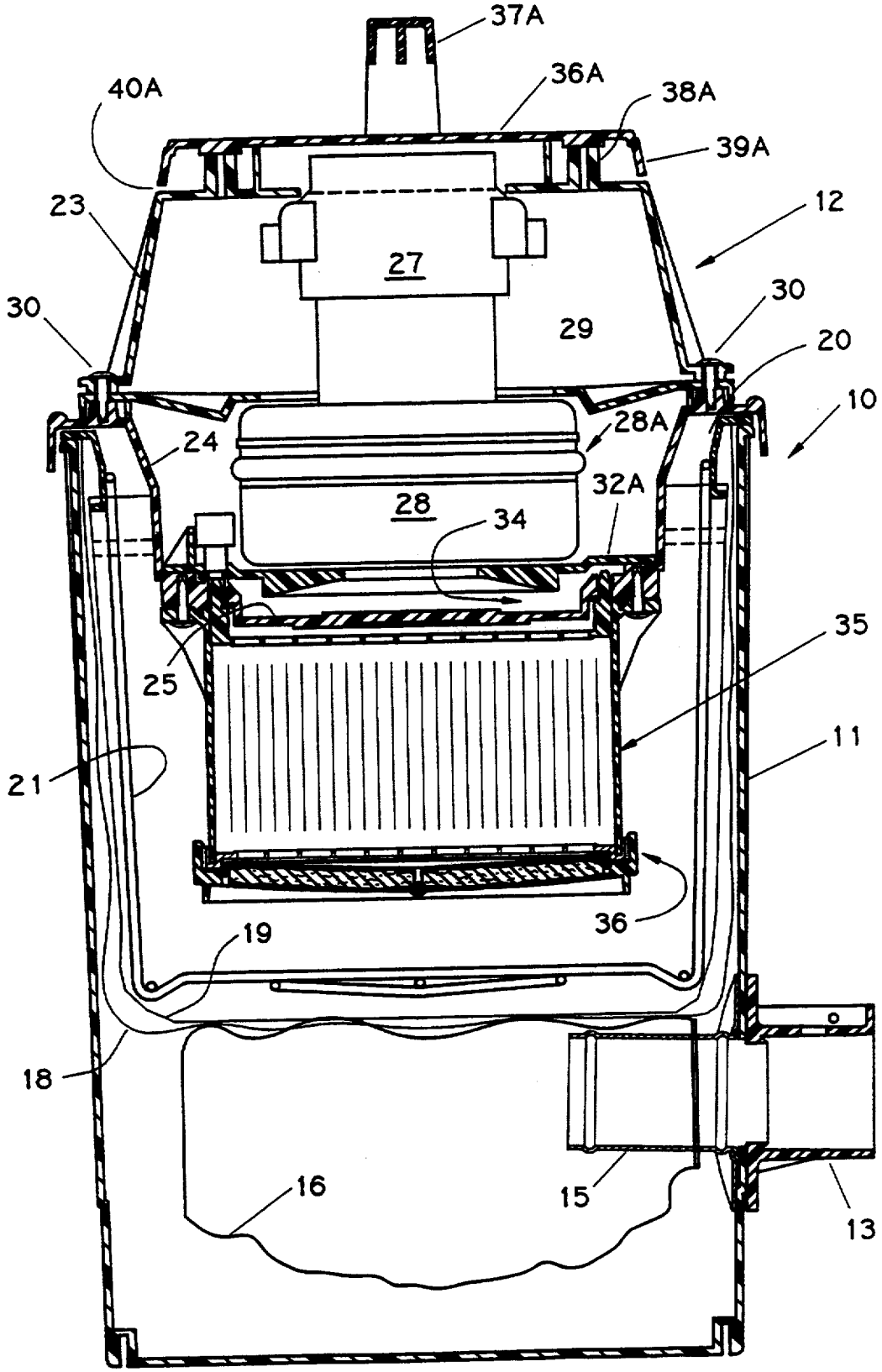
FIG. 1 is a vertical cross-sectional view of a vacuum suction machine incorporating the present invention.

Turning first to FIG. 1, there is shown a five-stage vacuum suction machine generally designated 10 including a container or canister 11, in the general form of a cylinder or drum. The container 11 forms a receptacle for collecting debris and it has an open top on which is mounted a vacuum motor housing generally designated 12. In the side wall of the container 11, toward the bottom, there is an intake assembly 13 to which a hose coupled to a removal tool would ordinarily be attached. An tubular extension 15 is attached to the inner part of the intake 13, and it extends within the lower portion of the container 11. A paper bag is mounted to the extension 15 for collecting larger debris; and the bag 16 acts as a first or course filter, as well as a disposable refuse bag.

A second paper bag 18 and a cloth filter bag 19 are located within the container 11, and they act as the second and third filter stages respectively. The upper perimeter of the outer paper bag 18 is folded over the upper edge of the container 11, and the upper perimeter of the cloth bag 19 is secured to a mounting ring 20 to which an inner wire frame or basket 21 is mounted. The frame 21 prevents the bags 18, 19 from collapsing onto the HEPA filter, as described below.

The motor housing 12 includes an upper section or dome 23 and a lower section or base 24 which includes an integral bottom 225. The central portion of the bottom of the motor housing is in the form of a grill or grid 25A (FIG. 3) so that air can readily pass through it, as will be appreciated by those skilled in the art.

Housed within the upper portion 23 of the motor housing is an electric motor generally designated 27 which is connected to and drives a vacuum blower generally designated 28. The motor and blower are mounted to a plate 29; and the upper section 23, lower section 24 and motor mounting plate 29 are all secured together by fasteners 30. Below the vacuum blower 28 there is an adapter plate 32A which is sealed to the blower intake and partially defines the upper portion of a vacuum chamber generally designated 34. Chamber 34 is in communication with the discharge of a high efficiency particulate air (HEPA) filter generally designated 35 via grid 25A formed in the bottom of the motor housing, as seen best in FIG. 2. An impact filter assembly generally designated 36 is mounted to the bottom of the HEPA filter 35.

A cover 36A provided with a handle 37A is conventionally mounted to the top of the upper section 23 of the motor housing by means of fasteners fitted through spacers 38A. The cover 36A has a side skirt 39A, the lower portion of which is spaced above the upper section 23 of the motor housing to define a peripheral aperture 40A through which air is drawn to cool the motor. The cooling air is exhausted outwardly through 20 openings between upper section 23 and the motor mounting plate 29.

Air carrying debris passes through the five filter stages described above, the chamber 34 and the vacuum blower 28, from which the air is exhausted radially outward at 28A. The clean air is then exhausted outwardly between the motor mounting plate 29 and the lower housing section 24. What has been described thus far is generally representative of vacuum suction machines used for removal of hazardous material which have been commercially available prior to the instant invention.

Figure 2:
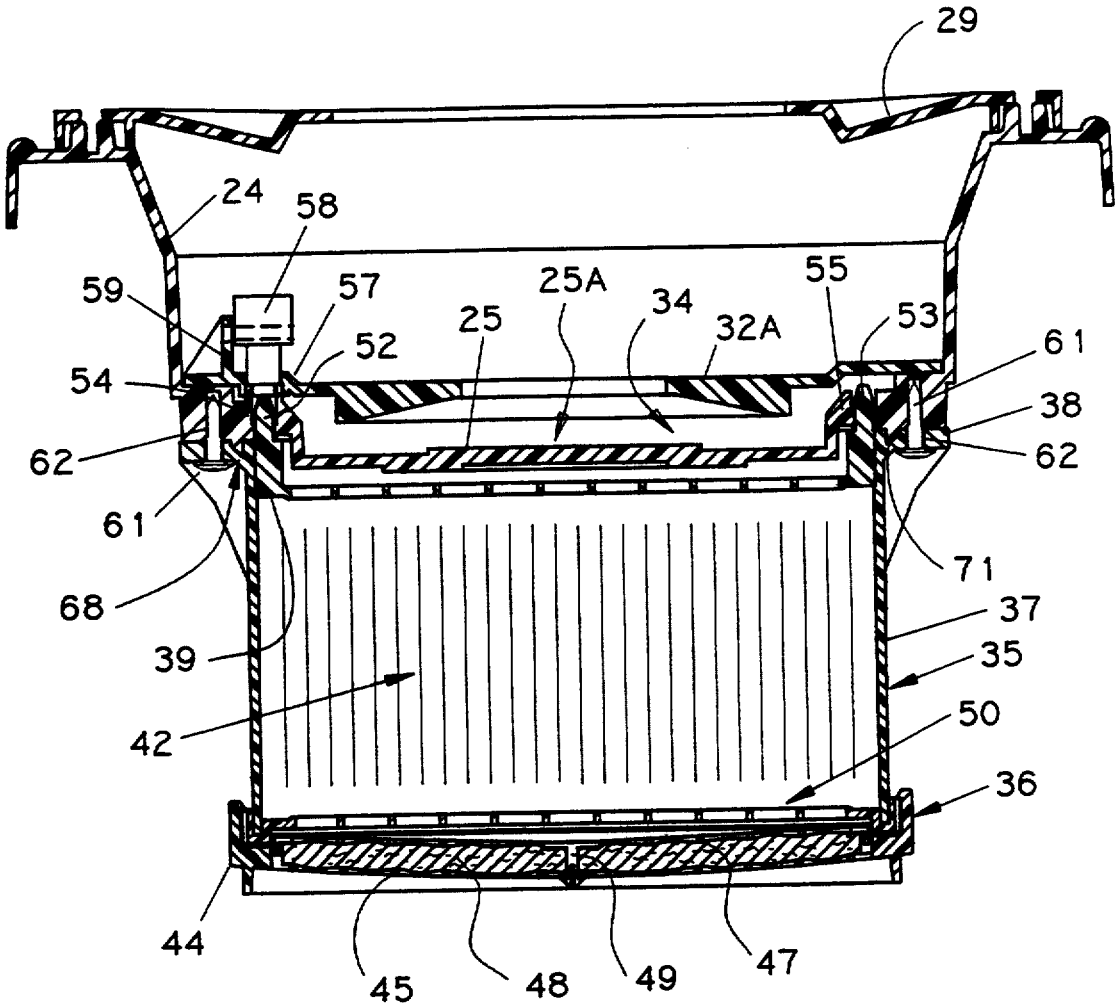
FIG. 2 is an enlarged vertical cross section of the filter and the lower portion of the motor housing in assembled relation.
Figure 3:
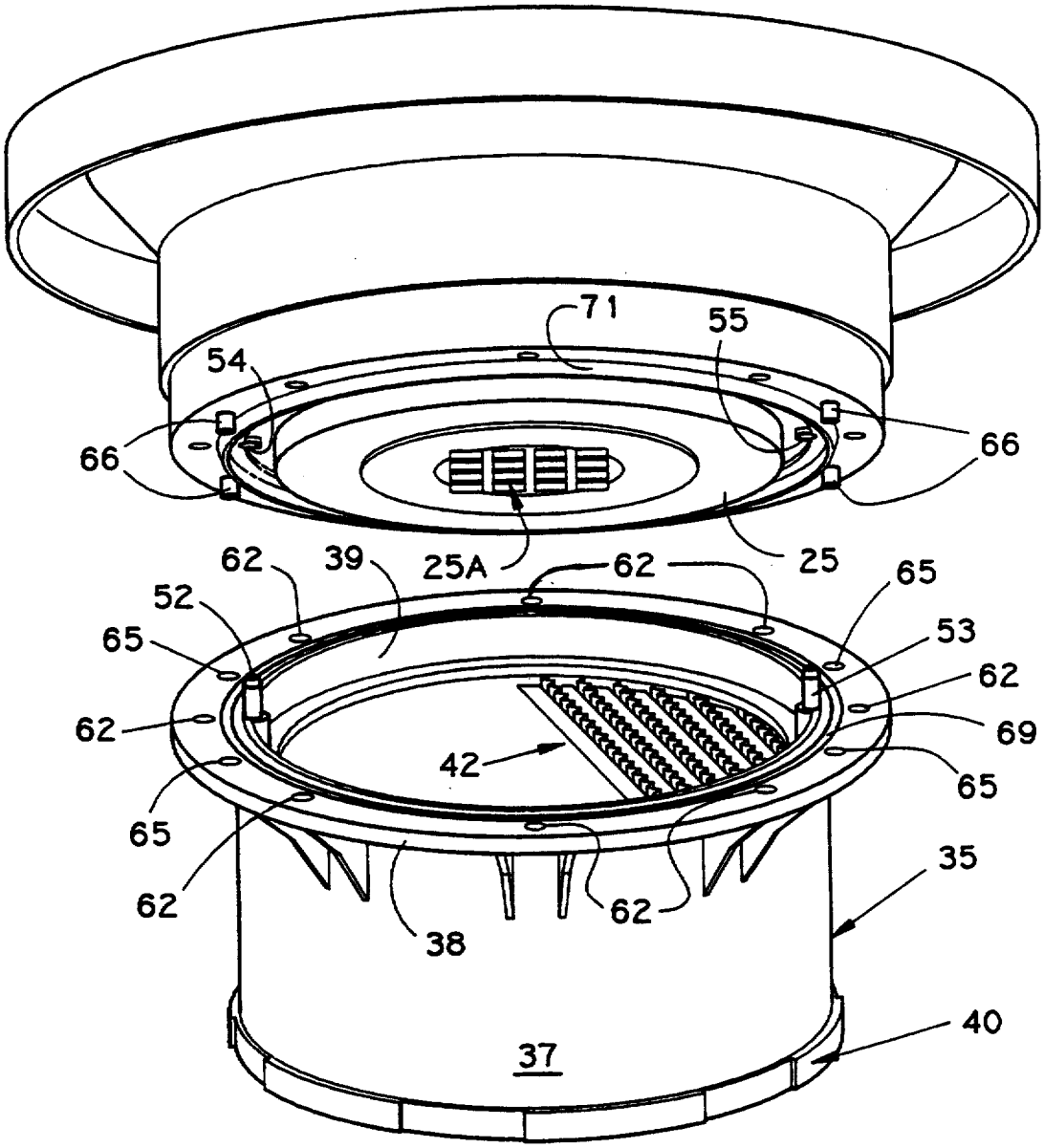
FIG. 3 is a perspective view showing the motor housing and HEPA filter prior to assembly.

Turning now to FIGS. 2 and 3, the HEPA filter 35 includes a generally cylindrical side wall 37, an upper mounting flange 38, an upper peripheral projection ring 39 and a lower flange 40. A conventional filter labyrinth of paper generally designated 42 forms the actual filtering material of the HEPA filter.

The pre-filter or fourth-stage filter (or "impact" filter, as it is sometimes referred) 36 includes a mounting ring 44 which snaps onto the mounting flange 40 at the base of the canister 37 of the HEPA filter, and which includes a lower grid 45, and an upper filter retainer 47. Between the lower grid 45 and the upper retainer grid 45 47, there is a layer of filter material 48. The centers of the upper and lower grids 45, 46 may be pinned together by a fastener/spacer 49, as illustrated.

Turning now to the HEPA filter as seen in FIG. 2, it includes a lower grid 50 immediately above the impact filter 36 and below the particulate filter medium 42, which conventionally consists of a labyrinth of paper and spacers. The upper ring 39 includes upwardly extending projections or fingers 52, 53 respectively, which are located at diagonally opposite positions on the ring 39. The ring 39 is attached, as by chemical bonding or heat or sonic welding to the inner surface of the side wall 37. From FIG. 2, it will be seen that the bottom wall 25 of the lower section 24 of the motor housing is provided with first and second apertures 54, 55 for receiving the fingers 52, 53 respectively. Similarly, the adapter plate 32 is provided with an aperture 57 for receiving the plunger or actuator of an electrical position switch $8 (sometimes referred to as the lockout switch) mounted to a flange 59. The location of the aperture 57 is such that when the HEPA filter is properly seated, one of the actuating fingers, 52, 53 engages the plunger of the switch 58 to actuate it.

The switch 58 is connected in circuit with the power lead from the main on/off switch mounted on the motor housing. The switch 58 is a normally open switch so that when the HEPA filter is removed, the switch 58 is opened and disables or "locks out" the motor by opening a power line to the motor. When the HEPA filter is properly assembled to the motor housing, however, one of the actuating fingers or members 52, 53 actuates the switch 58 and enables the motor to operate normally. The HEPA filter is secured to the bottom wall 25 of the lower section of the motor housing by threaded fasteners 61 which are received through apertures 62 in the mounting flange 38. As best seen in FIG. 3, there are eight such apertures 62 on the mounting flange 38 of the HEPA filter for receiving fasteners.

There are four additional apertures designated 65 in FIG. 3 and located at predetermined locations which register with projections or pins extending from the bottom plate 25 of the motor housing. The pins 66 on the motor housing and apertures 65 on the HEPA filter must register and mesh before the filter can be assembled and fastened to the housing. This insures that filters of improper size or capacity will not be used in the machine. This combination of pins and apertures also helps locate the filter in angular orientation so that the actuating members 52, 53 are in proper register with the apertures 54, 55 of the bottom plate during assembly. This combination further insures proper seating of a tongue-in-groove seal 68 between the bottom wall of the motor housing and the upper mounting flange 38 of the HEPA filter.

In the illustrated embodiment, an annular groove of wedge-shaped cross section 69 is formed in the flange 38 facing upwardly, to receive a correspondingly shaped annular tongue 71 formed on the bottom of the motor housing 25 (See FIGS. 2 and 3). Conversely, the tongue 71 could be formed on the HEPA filter and the groove could be formed in the bottom surface of the motor housing. Both the tongue and the groove extend around the periphery of the filter and form a desirable labyrinth seal between the motor housing and the HEPA filter when the HEPA filter is properly assembled and fastened to the motor housing to insure that air does not pass around the filter but, rather, is forced to pass through the filter in operation.

It will thus be apparent to persons skilled in the art that the arrangement of projections and apertures is a first measure against the use of improper filters and they further insure proper assembly and seal engagement. It will also be appreciated that a complete peripheral seal in the form of a tongue-in-groove arrangement provides a labyrinth seal and desirably insures a continuous seal between the motor housing and the HEPA filter. Finally, the finger/actuators 52, 53 also serve to locate the filter relative to the motor housing and to insure against improper filter replacement, but they also preclude operation of the machine without the presence of a HEPA filter.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In a vacuum machine for collecting hazardous materials, the combination comprising: a motor housing having an air discharge opening and an air inlet opening: a motor and a vacuum fan mounted within said housing for generating a vacuum in a portion of said housing in fluid communication with said air inlet opening: a container providing a reservoir for collecting material and including an air intake; means for mounting said motor housing to said container; a high efficiency particle filter having a canister with a generally cylindrical side wall; said filter being mounted to the bottom of said motor housing and covering said inlet opening, said filter including at least one actuating member; a switch connected in circuit with said vacuum motor and mounted to said housing such that when said filter is properly/assembled to said housing said actuating member of said filter engages and actuates said switch to permit said motor to be energized; said canister including an upper circular mounting flange and said motor homing including a bottom wall receiving said mounting flange of said filter, one of said mounting flange and bottom wall defining a circular peripheral groove and the other defining a circular peripheral tongue in said groove and [seal] *sealed* therewith. said filter being assembled to said motor housing; means for releasably securing said mounting flange to the bottom motor housing; and wherein one of said mounting flange and bottom wall defines a plurality of projections and the other defines a plurality of apertures in register with and receiving said projections such that said filter is properly assembled to said housing, thereby to preclude improper assembly of a filter to said housing.

*2. An improved high efficiency particle filter for use in a vacuum machine for collecting hazardous materials having a motor housing with an air discharge opening and an air inlet opening, a motor and a vacuum fan mounted within said housing for generating a vacuum, and a portion of said housing being in fluid communication with said air inlet opening, a container providing a reservoir for collecting material and including an air intake, said motor housing being mounted in said container, a switch connected in circuit with said vacuum motor and mounted to said motor housing and permitting said motor to be energized when said switch is actuated, said motor housing including a bottom wall defining said air inlet opening and including a circular peripheral sealing tongue extending about said air inlet opening on the bottom surface thereof and further including a plurality of locating apertures spaced at predetermined locations about said air inlet opening of said motor housing, said filter comprising: a canister having a generally cylindrical side wall and including an upper circular mounting flange adapted to be mounted to the bottom wall of said motor housing and covering said inlet opening, said filter including at least one actuating member adapted to engage said switch to enable said vacuum motor to be energized when said filter is properly assembled to said housing, said upper circular mounting flange of said filter further including circular means adapted to engage said sealing tongue of said motor housing to seal therewith when said filter is mounted to said bottom wall of said motor housing under compression of the mounting means, said mounting flange of said filter further defining a plurality of projections located to be received in said locating apertures of said bottom wall of said housing to register therewith and be received therein when said filter is assembled to said housing.*

*3. The apparatus of claim 2 wherein said sealing means located in said mounting flange of said filter comprises a peripheral groove adapted to receive and seal with said peripheral tongue of said bottom wall of said housing.*

* * * * *